US 12,145,608 B2

(12) United States Patent
Laarousi et al.

(10) Patent No.: US 12,145,608 B2
(45) Date of Patent: Nov. 19, 2024

(54) METHOD AND DEVICE FOR EVALUATING A PERFORMANCE OF AT LEAST ONE ENVIRONMENT SENSOR OF A VEHICLE, AND VEHICLE HAVING SUCH A DEVICE

(71) Applicant: MERCEDES-BENZ GROUP AG, Stuttgart (DE)

(72) Inventors: Rihab Laarousi, Gärtringen (DE); Tobias Stracke, Karlsruhe (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/567,393

(22) PCT Filed: Apr. 20, 2022

(86) PCT No.: PCT/EP2022/060344
§ 371 (c)(1),
(2) Date: Dec. 6, 2023

(87) PCT Pub. No.: WO2022/258248
PCT Pub. Date: Dec. 15, 2022

(65) Prior Publication Data
US 2024/0270265 A1    Aug. 15, 2024

(30) Foreign Application Priority Data
Jun. 7, 2021    (DE) ...................... 10 2021 002 910.0

(51) Int. Cl.
*B60W 50/00* (2006.01)
*B60W 50/029* (2012.01)
(Continued)

(52) U.S. Cl.
CPC .......... *B60W 50/029* (2013.01); *B60W 60/00* (2020.02); *B60W 2420/403* (2013.01);
(Continued)

(58) Field of Classification Search
None
See application file for complete search history.

(56) References Cited

U.S. PATENT DOCUMENTS 10,468,062 B1 * 11/2019 Levinson ................ G01S 7/497
11,816,585 B2 * 11/2023 Shen ........................ G06N 5/04
(Continued)

FOREIGN PATENT DOCUMENTS

DE    102017006260 A1    1/2018

OTHER PUBLICATIONS

International Search Report and Written Opinion mailed Jul. 25, 2022 in related/corresponding International Application No. PCT/EP2022/060344.

*Primary Examiner* — Jonathan M Dager
(74) *Attorney, Agent, or Firm* — PATENT PORTFOLIO BUILDERS PLLC

(57) ABSTRACT

Performance of at least one environment sensor of a vehicle is evaluated by recording false negatives of the environment sensor regarding a reference object, classifying the false negatives recorded according to chronological length and respectively assigning the false negatives to one of several pre-determined time classes. A false negative rate for each of the time classes is determined specifying how often false negatives of the respective time class occur during the evaluation period. A false negative threshold is predetermined for each of the time classes. For each time class it is determined how often the false negative rate of the time class exceeds the false negative threshold pre-determined for the time class. The performance of the environment sensor is evaluated as impaired if the number of instances in which the false negative threshold for the respective time class is exceeded by the false negative rate is higher than a value for the respective time class.

7 Claims, 1 Drawing Sheet

(51) Int. Cl.
  *B60W 60/00* (2020.01)
  *G01S 7/40* (2006.01)
  *G01S 7/497* (2006.01)
  *G01S 13/931* (2020.01)
  *H04N 17/00* (2006.01)

(52) U.S. Cl.
  CPC ... *B60W 2420/408* (2024.01); *B60W 2556/35* (2020.02); *G01S 7/40* (2013.01); *G01S 7/497* (2013.01); *G01S 13/931* (2013.01); *G01S 2013/9323* (2020.01); *H04N 17/002* (2013.01)

(56) References Cited

U.S. PATENT DOCUMENTS

| | | | |
|---|---|---|---|
| 2015/0347096 A1 | 12/2015 | Hanna | |
| 2018/0068206 A1* | 3/2018 | Pollach | G06V 20/56 |
| 2021/0082090 A1* | 3/2021 | Herman | G06T 5/94 |
| 2021/0101624 A1* | 4/2021 | Philbin | G06F 18/251 |
| 2021/0117787 A1* | 4/2021 | Stal | G06N 3/04 |
| 2022/0398851 A1* | 12/2022 | Nehmadi | G01S 17/931 |
| 2023/0061682 A1* | 3/2023 | Gade | G06F 18/251 |
| 2023/0360375 A1* | 11/2023 | Kabzan | G06N 20/00 |
| 2024/0017743 A1* | 1/2024 | Farid | B60W 60/00274 |

* cited by examiner

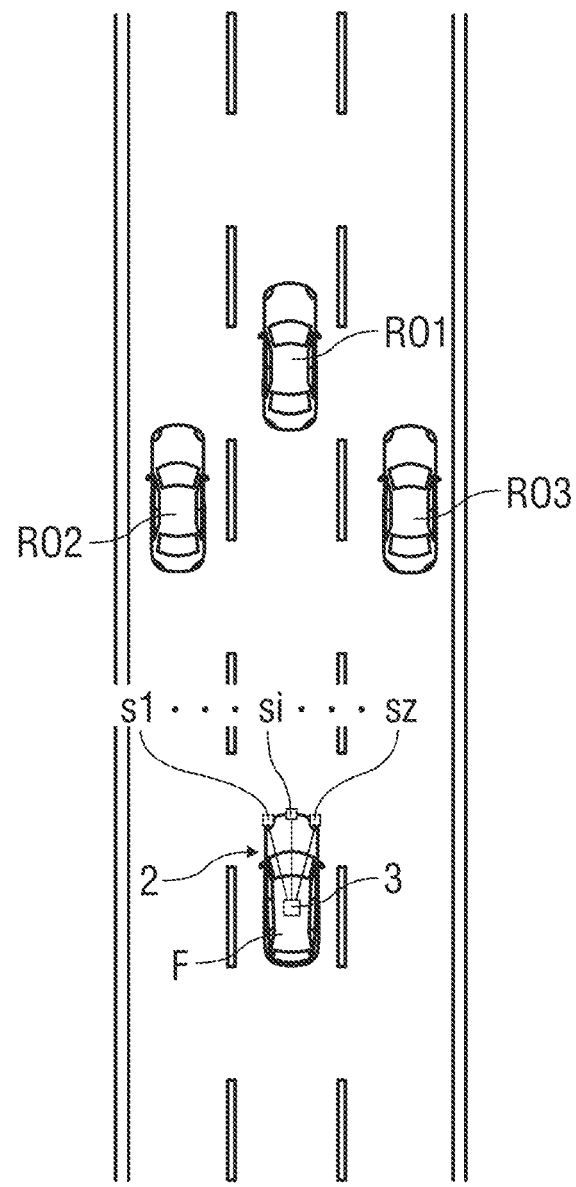

METHOD AND DEVICE FOR EVALUATING A PERFORMANCE OF AT LEAST ONE ENVIRONMENT SENSOR OF A VEHICLE, AND VEHICLE HAVING SUCH A DEVICE

BACKGROUND AND SUMMARY OF THE INVENTION

Exemplary embodiments of the invention relate to a method for evaluating a performance of at least one environment sensor of a vehicle, to a device for evaluating a performance of at least one environment sensor of a vehicle, and to a vehicle.

A method for determining detection properties of at least one environment sensor in a vehicle and a vehicle equipped to carry out such a method are known from the prior art, as described in DE 10 2017 006 260 A1. The method comprises reading a plurality of environment sensors of a vehicle, respectively in a plurality of measurement cycles, identifying an identical target object in each measurement cycle of the plurality of measurement cycles, wherein for at least one environment sensor to be checked of the plurality of environment sensors, it is checked for each measurement cycle of the plurality of measurement cycles whether the target object was recorded by the environment sensor to be checked in the respective measurement cycle, forming a detection number for the environment sensor to be checked as a number of those measurement cycles of the plurality of measurement cycles in which the target object was recorded by the environment sensor to be checked, and determining a performance parameter for the environment sensor to be checked from the detection number.

Exemplary embodiments of the invention are directed to a method for evaluating a performance of at least one environment sensor of a vehicle, the method being improved in relation to the prior art, a device for evaluating a performance of at least one environment sensor of a vehicle, said device being improved in relation to the prior art, and a vehicle which is improved in relation to the prior art.

In a method according to the invention for evaluating a performance of at least one environment sensor or of several environment sensors of a vehicle, in particular of a vehicle which is equipped for an automated driving operation, in particular for a highly automated or autonomous driving operation, the following method steps are carried out:
  recording, in particular continuously recording, false negatives of the environment sensor with regard to at least one reference object,
  classifying the false negatives recorded during a pre-determined evaluation period according to their chronological length, and assigning them respectively to one of several pre-determined time classes,
  determining a false negative rate of the respective time class for each of the time classes, which specifies how often false negatives of the respective time class occur during the pre-determined evaluation period,
  pre-determining a false negative threshold for each of the time classes,
  determining, for each time class, how often the false negative rate of the respective time class exceeds the false negative threshold pre-determined for this time class,
  evaluating the performance of the environment sensor as impaired if the determined number of instances, in particular within a pre-determined period, for example an hour, in which the false negative threshold pre-determined for the respective time class has been exceeded by the false negative rate is higher than a value pre-determined for the respective time class, in particular a frequency threshold pre-determined for the respective time class.

A device according to the invention for evaluating a performance of at least one environment sensor of a vehicle, in particular of a vehicle equipped for an automated driving operation, in particular for a highly automated or autonomous driving operation, is designed and equipped to carry out the method. In particular, the device comprises a processing unit, which is designed and equipped to carry out the method. The device in particular additionally comprises the at least one environment sensor of the vehicle, in particular several environment sensors of the vehicle. The respective environment sensor is for example designed as a radar sensor, lidar sensor or camera sensor, wherein the device can comprise several environment sensors which are designed identically or differently.

A vehicle according to the invention comprises this device. The vehicle is in particular designed and equipped to carry out an automated driving operation, in particular a highly automated or autonomous driving operation.

The at least one or the respective environment sensor is, in particular, an environment recording sensor, in particular for recording an external environment of the vehicle. The performance of the at least one environment sensor is also described as sensor performance.

Reference objects are selected objects that are suitable for evaluating the performance with regard to the false negatives. The reference object can be selected according to the following criteria:
  the object exists, i.e., it is recognized by at least one of the environment sensors,
  the object ought to be recognized by the environment sensors to be evaluated, and is thus located in the recording region of the latter, and
  the object is not hidden from the environment sensors to be evaluated.

The reference objects are thus for environment sensors that have a recording region aligned straight or obliquely forwards, in particular objects which are located directly in front of the vehicle and laterally in front of the vehicle. Examples of objects that are not suitable as reference objects are, for example, an object that is hidden from the respective environment sensor and an object which is located outside of the detection region, i.e., of the recording region, of the environment sensor. Such objects are not suitable for checking the detection performance, i.e., the performance in relation to detections, of an environment sensor, because they cannot be recorded by the environment sensor, and thus are not detected by the environment sensor.

The evaluation of the performance of the at least one environment sensor is thus based in the solution according to the invention on, in particular continuously, determining false negatives of the environment sensor and on classifying the durations of the determined false negatives, i.e., of non-detection durations, according to pre-determined time classes. False negative means that an environment sensor detects no object at a location although there is actually an object present at that location. A false negative is thus a measurement result, which specifies that the environment sensor has not detected an object that is visible to it in a measurement cycle. A false negative rate of the respective time class is determined for each of the time classes, which specifies how many times false negatives of the respective time class occur during the pre-determined evaluation period. For each of the time classes, a false negative threshold is defined. For each time class, it is determined how many times the false negative rate of the respective time class exceeds the false negative threshold defined for this time class. If the determined number of times in which the threshold is exceeded is higher than a value pre-determined for the respective time class, the performance is evaluated as impaired.

In the automated, in particular highly automated or autonomous, driving operation, the vehicle, in particular a system of the vehicle for carrying out the automated, in particular highly automated or autonomous, driving operation must recognize whether its environment sensors fulfil pre-determined requirements with regard to their performance in relation to object recognition, for example pre-determined detection rates. This is made possible via the solution according to the invention. If these requirements are not fulfilled, the automated, in particular highly automated or autonomous, driving operation is adapted to the reduced performance, for example by reducing a maximum permissible driving speed, or the automated, in particular highly automated or autonomous, driving operation is ended and the vehicle control is handed over to a vehicle driver.

Due to the solution according to the invention, the automated, in particular highly automated or autonomous, driving operation is thus made safe, because it is only permitted if the performance of the at least one or of respective environment sensor, i.e., the sensor performance fulfils pre-determined requirements.

In a possible embodiment, the method steps are carried out in the case of several reference objects for each reference object, and/or are carried out in the case of several environment sensors for each environment sensor. All the environment sensors of the vehicle can thus be evaluated with regards to their performance by means of the described solution. By using all the reference objects, the evaluation of the performance is improved.

In a possible embodiment, to record the false negatives, detection results of other environment sensors of the vehicle with regards to the reference object are taken into account. It can thus, in particular, be determined whether a respective object is a suitable reference object, and it can be determined whether the object would have to be able to be recorded by means of the environment sensor to be evaluated so that the false negatives can be correctly determined for the environment sensor to be evaluated.

In a possible embodiment, the detection results of a sensor data fusion of the other environment sensors of the vehicle are used. Reliability when determining the false negatives for the environment sensor to be evaluated is thus increased, and the evaluation of the performance of the latter is thus improved.

In a possible embodiment, the performance of an environment sensor, designed as a radar sensor, lidar sensor or camera sensor, of the vehicle is evaluated.

In a possible embodiment, the performance of an environment sensor of the vehicle is evaluated, the environment sensor having a recording region that is aligned straight or obliquely to the front or straight or obliquely to the rear. Other traffic participants can thus, in particular, be used as reference objects, which traffic participants are located straight or obliquely in front of the vehicle or straight or obliquely behind the vehicle over a relatively long period of time, in particular other traffic participants driving ahead of or behind the vehicle.

In a possible embodiment, when the performance is evaluated as impaired, the automated, in particular highly automated or autonomous, driving operation is adapted to the performance that has been evaluated as impaired, in particular a speed of the vehicle is reduced or the automated driving operation is ended. It is thus ensured that the automated, in particular highly automated or autonomous, driving operation is only carried out with sufficiently high-performing environment sensors, and thus with a high degree of safety.

The described solution is, in particular, based on the idea that a false negative rate exceeding a particular false negative threshold can be better tolerated at a low non-detection duration than at a high non-detection duration. The performance of an environment sensor is thus advantageously evaluated depending on the false negative rate of the different time classes.

It is thus advantageously specified, as requirements that a particular environment sensor must fulfil, the maximum number of times within a pre-determined period, i.e., how frequently, the false negative rate of a particular time class can be the same as a false negative threshold defined for this time class. The false negative threshold is advantageously individually pre-determined for each sensor type, i.e., for example for the radar sensor, for the lidar sensor and for the camera sensor.

If the environment sensor fulfils all these requirements, its performance is evaluated as not impaired. The performance is otherwise evaluated as impaired.

Advantageously, the requirements of the remaining environment sensors are pre-determined and checked in an analogous manner.

Using the detected false negatives of an environment sensor, further values for evaluating the performance can, for example, also be calculated as an alternative or in addition, for example an average duration between the false negatives of an environment sensor and/or an average duration between the false negatives of a particular false negative class, i.e., time class, of an environment sensor.

Using the detected false negatives of an environment sensor in a particular window of time, further statistics can for example also be determined for longer windows of time.

The described solution is thus advantageously based on the following idea:

False negatives of a selected environment sensor are continuously recorded. A false negative should be understood to mean a measurement result, which specifies that the selected environment sensor has not detected at least one reference object that can be seen by the environment sensor in a measurement cycle. The information about the presence of the reference objects that can be seen by the environment sensor is delivered by other environment sensors.

The false negatives recorded during a pre-determined evaluation period are classified according to their chronological length, in order to respectively assign them to one of several pre-determined time classes.

For each of the pre-determined time classes, it is determined how many times within the pre-determined evaluation period false negatives of the respective time class are detected. The number of false negatives of a particular time class determined within the evaluation period corresponds to the false negative rate of this time class.

For each time class, a false negative threshold is defined.

For each time class, a frequency threshold is defined.

For each time class, it is determined whether the false negative threshold of the respective time class is exceeded by the false negative rate of the respective time class, and with which frequency, in particular how many times per hour these instances of the false negative threshold being exceeded actually occur. If the determined frequency exceeds the frequency threshold defined for the respective time class, the performance of the environment sensor is evaluated as impaired.

The steps above are advantageously carried out for each reference object present and for each of the environment sensors to be checked.

BRIEF DESCRIPTION OF THE DRAWING FIGURE

Exemplary embodiments of the invention are explained in more detail in the following with reference to a drawing.

Here:

The sole FIGURE schematically shows a traffic situation with a vehicle and several reference objects in the form of other vehicles in an environment of the vehicle.

DETAILED DESCRIPTION

The sole FIGURE shows a schematic depiction of a traffic situation with a vehicle F and several reference objects RO1, RO2, RO3, in the form of other vehicles, in an environment of the vehicle F. The vehicle F is, in particular, a vehicle F equipped for an automated driving operation, in particular for a highly automated or autonomous driving operation.

The vehicle F comprises a device 2, which is designed and equipped to carry out a method described in the following for evaluating a performance of at least one environment sensor s1, si, sz or of several environment sensors s1, si, sz of such a vehicle F. With regards to the environment sensors s1, si, sz, i is a control variable of 1 to z, i.e., s1 to sz environment sensors are present on the vehicle F. The plurality of environment sensors s1, si, sz present on the vehicle F, where i=1 to z, is thus also described in the following as environment sensors s1 to sz. In the following, if it is not for example specifically referred to as s1, the respective environment sensor is referred to as environment sensor s1 to sz or as environment sensor si.

The device 2, in particular, comprises a processing unit 3 that is, in particular, coupled with the environment sensors s1 to sz. In particular, this processing unit 3 is designed and equipped to carry out this method. The vehicle F, in particular its device 2, additionally comprises, in particular, the at least one environment sensor s1 to sz, in particular several environment sensors s1 to sz. The respective environment sensor s1 to sz is, for example, designed as a radar sensor, lidar sensor or camera sensor, wherein several environment sensors s1 to sz that are designed identically or differently can be provided. The at least one or respective environment sensor s1 to sz is, in particular, an environment recording sensor, in particular for recording an external environment of the vehicle F. The performance of the at least one or respective environment sensor s1 to sz is also described as sensor performance.

In the method, the following method steps are in particular carried out:

recording, in particular continuously recording, false negatives of the environment sensor s1 to sz with regard to at least one reference object RO1, RO2, RO3, classifying the false negatives recorded during a pre-determined evaluation period according to their chronological length, and assigning them respectively to one of several pre-determined time classes, determining a false negative rate of the respective time class for each of the time classes, which specifies how often false negatives of the respective time class occur during the pre-determined evaluation period, pre-determining a false negative threshold for each of the time classes, determining, for each time class, how often the false negative rate of the respective time class exceeds the false negative threshold pre-determined for this time class, evaluating the performance of the environment sensor s1 to sz as impaired if the determined number of instances, in particular within a pre-determined period, for example an hour, in which the false negative threshold pre-determined for the respective time class has been exceeded by the false negative rate is higher than a value pre-determined for the respective time class, in particular a frequency threshold pre-determined for the respective time class.

In particular, in the highly automated driving operation, the vehicle F or a system of the vehicle F for carrying out this highly automated driving operation must recognize whether its environment sensors s1 to sz fulfil pre-determined requirements with regard to their performance with regard to object recognition, e.g., detection rates. If these requirements are not fulfilled, i.e., if the performance is evaluated as impaired, the highly automated driving operation is adapted to the reduced performance, for example by reducing a maximum permissible driving speed, or the highly automated driving operation is ended and the vehicle control is handed over to a vehicle driver. The method described here makes it possible to evaluate the performance of the respective environment sensor s1 to sz.

Methods for determining the detection rates of environment sensors s1 to sz are already known from the prior art, for example from DE 10 2017 006 260 A1. In this prior art, the determination is based on a statistical evaluation of object detections of the different environment sensors s1 to sz.

When evaluating sensor detections, a differentiation is usually made between false positives, false negatives, and true positives. False positive means that an environment sensor s1 to sz detects an object at a location although there is actually no object present at that location. This is also described as a ghost object. False negative means that an environment sensor s1 to sz detects no object at a location although there is actually an object present at that location. True positive, i.e., actually positive, means that an environment sensor s1 to sz detects an object at a location which is actually present at that location. True positives are referred to as detection rates in the prior art specified above.

The evaluation of the performance of an environment sensor s1 to sz is based on continuously determining false negatives. A false negative is a measurement result, which specifies that the environment sensor s1 to sz has not detected an object, in the depicted example the respective reference object RO1, RO2, RO3, which is visible to it in a measurement cycle.

Non-detection durations are further determined, and thus the durations of the false negatives. The non-detection durations are classified corresponding to their duration and respectively assigned to one of several time classes. It is determined how many times false negatives of the respective time class occur during a pre-determined evaluation period. The number of determined false negatives of a particular time class depending on the evaluation period is described as a false negative rate (FN rate) of the respective time class. For each of the time classes, a false negative threshold (FN threshold) is defined. For each time class, it is determined how many times the false negative rate of the respective time class exceeds the false negative threshold defined for this time class. If the determined number of times in which the threshold is exceeded is higher than a value pre-determined for the respective time class, the performance is evaluated as impaired.

Several environment sensors s1 to sz are advantageously used for object detection, and objects that are detected in pre-determined location regions of the vehicle environment are identified as reference objects RO1, RO2, RO3, i.e., as relevant objects. The detection of the objects is implemented via sensor data fusion. Advantageously, detection results of several or all other environment sensors s1 to sz of the vehicle F are used to evaluate the performance of a respective environment sensor s1 to sz, in particular to record the false negative with regard to the or the respective reference object RO1, RO2, RO3. These detection results of the other environment sensors s1 to sz are advantageously subjected to a sensor data fusion, and the fused sensor data is then used for the purpose described.

The pre-determined location regions are regions of interest, which are located in the environment of the vehicle F, for example directly ahead, to the front left, to the front right, within the sensor range. Objects that are relevant to the vehicle F, i.e., to which the vehicle F must react quickly or to which the system must react with a particular intended behavior, are located in these location regions. By means of the method described here, the performance of one or of a respective environment sensor s1 to sz of the vehicle F is thus, in particular, evaluated, the environment sensor having a recording region which is aligned straight or obliquely ahead.

Reference objects RO1, RO2, RO3 are selected objects, which are suitable for carrying out a particular performance test, for example evaluating the performance with regards to the false negatives. The reference object RO1, RO2, RO3 can be selected according to the following criteria:
- the object exists, i.e., it is recognized by at least one of the environment sensors s1 to sz,
- the object ought to be recognized by the environment sensor s1 to sz to be evaluated, and is thus located in the recording region of the latter, and
- the object is not hidden from the environment sensor s1 to sz to be evaluated.

The reference objects RO1, RO2, RO3 are thus, in particular, objects that are located directly ahead of the vehicle F and laterally ahead of the vehicle F. Examples of objects that are not suitable as reference objects RO1, RO2, RO3 are, for example, an object hidden from the environment sensor s1 to sz and an object located outside of the detection region of the environment sensor s1 to sz. Such objects are not suitable for checking the detection performance, i.e., the performance in relation to detections, of an environment sensor s1 to sz, because they cannot be recorded by the environment sensor s1 to sz, and thus are not detected by the environment sensor s1 to SZ.

In the example according to FIG. 1, the reference objects RO1, RO2, RO3 are other vehicles located directly and laterally ahead of the vehicle F.

The several environment sensors s1 to sz are, for example, respectively a radar sensor, a lidar sensor or a camera sensor. Combinations of several identical or different environment sensors s1 to sz are possible.

For each of the environment sensors s1 to sz, the false negative rate (FN rate) is determined using the detected false negatives of the respective environment sensor s1 to sz. The determination is implemented over a pre-determined period of time, i.e., over a pre-determined evaluation period. This pre-determined period of time, i.e., the pre-determined evaluation period, comprises a pre-determined number of measurement cycles. The determination is implemented according to the following equation:

$$FN_{si} = \frac{N(FN)_{si}}{m^i} \quad (1)$$

Here, $FN_{si}$ represents the FN rate. $N(FN)_s$ stands for the number of times in which the environment sensor si has not recognized a reference object RO1, RO2, RO3, i.e., for the number of non-detections recognized. The number of measurement cycles which are carried out in the evaluation period is denoted $m^i$. This number is a measure for the duration of the evaluation period.

It is further determined for the environment sensor si for how long the recognized non-detections lasted, i.e., a non-detection duration $L_{si}$ is determined. The non-detection duration $L_{si}$ corresponds to the number of measurement cycles which follow one after the other in which a reference object RO1, RO2, RO3 was not detected by the environment sensor si.

The non-detection durations $L_{si}$ are classified according to their chronological length. For this purpose, a series of time classes LK, k=1, . . . n are defined, and the determined non-detection durations are respectively assigned to one of these time classes Lk corresponding to their chronological length.

For each time class Lk, it is determined how many times false negatives of the respective time class Lk occur within the evaluation period, and on this basis, the false negative rate of the respective time class is calculated as follows.

$$FN(Lk)_{si} = \frac{N(Lk)}{T} \quad (2)$$

Here, $FN(Lk)_s$ stands for the false negative rate of the time class Lk. The index si specifies that the false negative rate of the time class Lk has been determined for the environment sensor si. N(Lk) stands for the number of false negatives that have been assigned to the time class Lk in the evaluation period. T stands for the duration of the evaluation period or for the number of measurement cycles in the evaluation period, which is equivalent. The false negative rate of the time class Lk thus corresponds to the result of a classification of the false negative rate according to the time classes.

It is further possible to classify the false negative rate, for example, based on object types, for example false negative rate of the time class Lk with regard to passenger cars, false negative rate of the time class Lk with regard to HGVs, and/or on the basis of further object properties, for example object speed.

The following table 1 is intended to illustrate how the performance of the environment sensor s1 is evaluated, for example for an environment sensor s1 and a reference object RO1, RO2, RO3. The environment sensor s1 is, for example, a lidar sensor, and the reference object RO1, RO2, RO3 is for example the vehicle driving immediately ahead in FIG. 1, i.e., the reference object RO1.

In this example, the evaluation period comprises nine measurement cycles. The reference object RO1 was able to be identified in each of the measurement cycles using the environment sensors s1 to sz present in the vehicle F. A short evaluation period is selected for illustration purposes; in an actual application a significantly longer period can be selected. The current measurement cycle is labelled $t_0$, and the previous eight measurement cycles are labelled $t_1$ to $t_8$. Table 1 shows the measurements cycles and the detections which have respectively taken place in the measurement cycles. 1 specifies that the environment sensor s1 has detected the reference object RO1 in the respective measurement cycle. 0 specifies that the environment sensor s1 has not detected the reference object RO1 in the respective measurement cycle.

For example, three time classes L1, L2 and L3 are defined as follows:

non-detection durations where $0<L_{s1}<2$ are assigned to the time class L1,
non-detection durations where $L_{s1}=2$ are assigned to the time class L2,
non-detection durations where $L_{s1}>2$ are assigned to the time class L3.

In the following, the time classes L1, L2, L3 are also described as FN classes.

TABLE 1

| measurement cycle | $t_{-8}$ | $t_{-7}$ | $t_{-6}$ | $t_{-5}$ | $t_{-4}$ | $t_{-3}$ | $t_{-2}$ | $t_{-1}$ | $t_0$ |
|---|---|---|---|---|---|---|---|---|---|
| detection | 1 | 0 | 1 | 1 | 1 | 1 | 1 | 1 | 1 |

For this example, the following applies:

$$FN_{s1} = \frac{1}{9_{cycles}} \quad (3)$$

and $$L_{s1} = 1 \quad (4)$$

This means that the reference object RO1 has not been detected by the environment sensor s1 in one of the nine observed measurement cycles. It has not been detected in a maximum of one measurement cycle, here in the measurement cycle $t_{-7}$.

The determined non-detection duration $L_{s1}=1$ is assigned to the time class L1 according to the classification defined above.

A false negative of the time class L1 is thus detected in one of nine measurement cycles.

The result for the false negative rate of the time class L1 is:

$$FN(L1)_{s1} = \frac{1}{9_{cycles}} \quad (5)$$

No false negatives of the time classes L2 or L3 are detected. The false negative rates of the time classes L2 and L3 are thus:

$$FN(L2)_{s1} = 0/9_{cycles} \quad (6)$$
$$FN(L3)_{s1} = 0/9_{cycles} \quad (7)$$

The following table 2 shows a further example of a measurement:

TABLE 2

| measurement cycle | $t_{-8}$ | $t_{-7}$ | $t_{-6}$ | $t_{-5}$ | $t_{-4}$ | $t_{-3}$ | $t_{-2}$ | $t_{-1}$ | $t_0$ |
|---|---|---|---|---|---|---|---|---|---|
| detection | 1 | 0 | 0 | 1 | 1 | 1 | 1 | 1 | 1 |

The false negative rate in this example is:

$$FN_{s1} = \frac{2}{9_{cycles}} \quad (8)$$

but there is a longer non-detection duration:

$$L_{s1} = 2 \quad (9)$$

This means that the reference object RO1 has not been detected by the environment sensor s1 in two of nine observed measurement cycles. It has not been detected in a maximum of two measurement cycles following one after the other.

The determined non-detection duration $L_{s1}=2$ is assigned to the time class L2 according to the classification defined above.

Only one false negative of the time class L2 is present, determined in two of nine measurement cycles.

The false negative rate of the time class L2 is thus:

$$FN(L2)_{s1} = \frac{1}{9_{cycles}} \quad (10)$$

No false negatives of the time classes L1 or L3 are detected. The false negative rates of the time classes L1 and L3 are thus:

$$FN(L1)_{s1} = 0/9_{cycles} \quad (11)$$
$$FN(L3)_{s1} = 0/9_{cycles} \quad (12)$$

In a measurement according to the following table 3:

TABLE 3

| measurement cycle | $t_{-8}$ | $t_{-7}$ | $t_{-6}$ | $t_{-5}$ | $t_{-4}$ | $t_{-3}$ | $t_{-2}$ | $t_{-1}$ | $t_0$ |
|---|---|---|---|---|---|---|---|---|---|
| detection | 1 | 0 | 0 | 0 | 1 | 1 | 1 | 1 | 1 | the FN rate is:

$$FN_{s1} = \frac{3}{9_{cycles}} \quad (13)$$

but there is an even longer non-detection duration:

$$L_{s1} = 3 \quad (14)$$

The determined non-detection duration $L_{s1}=3$ is assigned to the time class L3 according to the classification defined above.

A false negative of the time class L3 is present.

The false negative rate of the time class L3 is thus:

$$FN(L3)_{s1} = \frac{1}{9_{cycles}} \quad (15)$$

No false negatives of the time classes L1 or L2 are detected. The false negative rates of the time classes L1 and L2 are thus:

$$FN(L1)_{s1} = 0/9_{cycles} \quad (16)$$

$$FN(L2)_{s1} = 0/9_{cycles} \quad (17)$$

In a measurement according to:

TABLE 4

| measurement cycle | $t_{-8}$ | $t_{-7}$ | $t_{-6}$ | $t_{-5}$ | $t_{-4}$ | $t_{-3}$ | $t_{-2}$ | $t_{-1}$ | $t_0$ |
|---|---|---|---|---|---|---|---|---|---|
| detection | 1 | 0 | 0 | 0 | 1 | 1 | 0 | 1 | 0 | the false negative rate is:

$$FN_{s1} = \frac{5}{9_{cycles}} \quad (18)$$

and there are two non-detection durations, $$L_{s1} = 3 \quad (19)$$

and $$L_{s1} = 1 \quad (20)$$

The determined non-detection duration $L_{s1}=3$ is assigned to the time class L3, and the non-detection duration $L_{s1}=1$ is assigned to the time class L1.

A false negative of the time class L3 is present, and two false negatives of the time class L1 are present.

The false negative rates of the time classes L1 and L3 are thus:

$$FN(L1)_{s1} = \frac{2}{9_{cycles}} \quad (21)$$

$$FN(L3)_{s1} = \frac{1}{9_{cycles}} \quad (22)$$

These measurements are carried out for all environment sensors s1 to sz.

The described solution is based on the idea that a false negative rate exceeding a particular false negative threshold can be better tolerated at a low non-detection duration than at a high non-detection duration. The performance of an environment sensor s1 to sz is thus evaluated depending on the FN rates of the different time classes.

It is specified, as requirements that a particular environment sensor s1 to sz must fulfil, the maximum number of times within a pre-determined period, i.e., how frequently, the false negative rate of a particular time class Lk can be the same as a false negative threshold defined for this time class Lk. The false negative threshold is individually pre-determined for each sensor type.

For example, the requirement for an environment sensor s1 to sn is that the false negative rate of the time class L1 can reach the false negative threshold of the time class L1 at most five times in the hour, and may not be higher than this false negative threshold, that the false negative rate of the time class L2 can reach the false negative threshold of the time class L2 at most three times in the hour, and may not be higher than this false negative threshold, and that the false negative rate of the time class L3 can reach the false negative threshold of the time class L3 at most once in the hour, and may not be higher than this false negative threshold.

If the environment sensor s1 to sz fulfils all these requirements, its performance is evaluated as not impaired. The performance is otherwise evaluated as impaired. The performance is thus evaluated as impaired if it is determined that the false negative rate of the time class L1 exceeds the false negative threshold defined for this time class L1 more often than five times in the hour or if the false negative rate of the time class L2 exceeds the false negative threshold defined for this time class L2 more often than three times in the hour or if the false negative rate of the time class L3 exceeds the false negative threshold defined for this time class L3 more often than once in the hour.

In an analogous manner, the requirements of the remaining environment sensors s1 to sz are pre-determined and checked.

Using the detected false negatives of an environment sensor s1 to sz, further values for evaluating the performance can be calculated, for example the average duration between the false negatives of an environment sensor s1 to sz or the average duration between the false negatives of a particular false negative class (time class) of an environment sensor s1 to sz.

Using the detected false negatives of an environment sensor s1 to sz in a particular window of time, further statistics can be determined for longer windows of time.

The described solution is thus based on the following idea:

False negatives of a selected environment sensor si are continuously recorded. A false negative should be understood to mean a measurement result specifying that the selected environment sensor si has not detected at least one reference object RO1, RO2, RO3 that can be seen by the environment sensor si in a measurement cycle. The information about the presence of the reference objects RO1, RO2, RO3 which can be seen by the environment sensor si is delivered by other environment sensors s1 to sz.

The false negatives recorded during a pre-determined evaluation period are classified according to their chronological length, in order to respectively assign them to one of several pre-determined time classes Lk where k=1, . . . n.

For each of the pre-determined time classes Lk, where k=1, . . . n, it is determined how many times within the pre-determined evaluation period false negatives of the respective time class are detected. The number of false negatives of a particular time class determined within the evaluation period corresponds to the false negative rate of this time class.

For each time class Lk where k=1, ... n, a false negative threshold is defined.

For each time class Lk where k=1, ... n, a frequency threshold is defined.

For each time class Lk where k=1, ... n, it is determined whether the false negative threshold of the respective time class is exceeded by the false negative rate of the respective time class Lk, and with which frequency, i.e., how many times per hour these instances of the false negative threshold being exceeded actually occur. If the determined frequency exceeds the frequency threshold defined for the respective time class, the performance of the environment sensor si is evaluated as impaired.

The steps above are carried out for each reference object RO1, RO2, RO3 present and for each of the environment sensors s1 to sz to be checked.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for evaluating performance of an environment sensor of a vehicle equipped for an automated driving operation, the method comprising:
    recording false negatives of the environment sensor regarding at least one reference object;
    classifying the false negatives recorded during a predetermined evaluation period according to chronological length of the false negatives, and respectively assigning the false negatives to one of several predetermined time classes;
    determining a false negative rate for each of the predetermined time classes, wherein the false negative rate specifies how often false negatives of the respective one of the predetermined time class occur during the predetermined evaluation period;
    predetermining a false negative threshold for each of the predetermined time classes;
    determining, for each of the predetermined time classes as a determined number of instances, how often the false negative rate of the respective predetermined time class exceeds the false negative threshold pre-determined for the respective one of the predetermined time classes; and
    evaluating the performance of the environment sensor as impaired responsive to the determined number of instances in which the false negative threshold predetermined for the respective one of the time classes has been exceeded by the false negative rate is higher than a value predetermined for the respective one of the predetermined time classes.

2. The method of claim 1, wherein the method steps are performed for a plurality of reference objects or are performed for a plurality of environment sensors.

3. The method of claim 1, wherein, to record the false negatives, detection results of environment sensors of the vehicle other than the environment sensor regarding the reference object are taken into account.

4. The method of claim 3, wherein the detection results of a sensor data fusion of the other environment sensors of the vehicle are used.

5. The method of claim 1, wherein the environment sensor is a radar sensor, lidar sensor, or camera sensor.

6. The method of claim 1, wherein the environment sensor has a recording region aligned straight or obliquely to a front, or straight or obliquely to a rear.

7. The method of claim 1, wherein when the performance is evaluated as impaired, the automated driving operation is adapted to impaired performance of the environment sensor or is ended.

* * * * *